(12) United States Patent  (10) Patent No.: US 9,886,258 B2
Fan et al.  (45) Date of Patent: Feb. 6, 2018

(54) METHOD AND DEVICE FOR GRAYSCALE-UPGRADING

(71) Applicant: Xiaomi Inc., Beijing (CN)

(72) Inventors: Jialin Fan, Beijing (CN); Heng Qu, Beijing (CN); Baiming Ma, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 14/725,448

(22) Filed: May 29, 2015

(65) Prior Publication Data

US 2016/0048384 A1  Feb. 18, 2016

Related U.S. Application Data

(63) Continuation of application No. PCT/CN2015/072040, filed on Jan. 30, 2015.

(30) Foreign Application Priority Data

Aug. 12, 2014  (CN) .......................... 2014 1 0395821

(51) Int. Cl.
  *G06F 9/44*  (2006.01)
  *G06F 9/445*  (2006.01)
(52) U.S. Cl.
  CPC ..................... *G06F 8/65* (2013.01)
(58) Field of Classification Search
  None
  See application file for complete search history.

(56) References Cited

U.S. PATENT DOCUMENTS

| 2007/0288423 | A1 | 12/2007 | Kimoto |
| 2012/0090757 | A1 | 4/2012 | Buchan et al. |
| 2012/0166540 | A1 | 6/2012 | Reis et al. |
| 2013/0080526 | A1 | 3/2013 | Gill et al. |
| 2013/0091216 | A1 | 4/2013 | Rajakarunanayake et al. |
| 2013/0262210 | A1 | 10/2013 | Savage et al. |
| 2014/0074629 | A1* | 3/2014 | Rathod ................. G06Q 10/10 705/14.73 |
| 2014/0095334 | A1 | 4/2014 | Barton |
| 2014/0149248 | A1 | 5/2014 | Bao |
| 2014/0189648 | A1 | 7/2014 | Everitt |

(Continued)

FOREIGN PATENT DOCUMENTS

| CN | 102624771 A | 8/2012 |
| CN | 103036939 A | 4/2013 |
| CN | 103095743 A | 5/2013 |

(Continued)

OTHER PUBLICATIONS

First Office Action for Chinese Application No. 201510050761.2, from the State Intellectual Property Office of China, dated May 4, 2017.

(Continued)

*Primary Examiner* — Chuck Kendall
(74) *Attorney, Agent, or Firm* — Finnegan, Henderson, Farabow, Garrett & Dunner LLP

(57) ABSTRACT

A method for grayscale-upgrading includes determining a target social group to be grayscale-upgraded, determining a target user account to be grayscale-upgraded in the target social group, and grayscale-upgrading an application or device corresponding to the target user account.

17 Claims, 7 Drawing Sheets

(56) References Cited

U.S. PATENT DOCUMENTS

| | | | |
|---|---|---|---|
| 2014/0195297 A1 | 7/2014 | Abuelsaad et al. | |
| 2015/0054911 A1* | 2/2015 | Gottlieb | A63F 13/12 348/14.08 |

FOREIGN PATENT DOCUMENTS

| | | | |
|---|---|---|---|
| CN | 103168283 A | 6/2013 | |
| CN | 203117990 U | 8/2013 | |
| CN | 103365450 A | 10/2013 | |
| CN | 103888281 A | 6/2014 | |
| CN | 103906035 A | 7/2014 | |
| CN | 103916374 A | 7/2014 | |
| CN | 104049828 A | 9/2014 | |
| CN | 203838717 U | 9/2014 | |
| CN | 104156246 A | 11/2014 | |
| JP | 2003076581 A | 3/2003 | |
| JP | 2007334471 A | 12/2007 | |
| JP | 2013145504 A | 7/2013 | |
| JP | 2013223094 A | 10/2013 | |

OTHER PUBLICATIONS

*Google play,* dated May 24, 2013, retrieved from http://qiita.com/kaa/items/3904845d225d40f9a6ef, on Sep. 7, 2016.
*Beta-testing and staged rollouts,* dated Apr. 14, 2014, retrieved from http://web.archive.org/web/20140414234700/https://supportgoogle.com/googleplay/a . . . , on Sep. 7, 2016.
Extended Search Report for European Patent Application No. 15180597.5(1958), dated Oct. 21, 2015.
International Search Report of PCT Application No. PCT/CN2015/072040, dated May 13, 2015, issued by the State Intellectual Property Office of the P.R. China.
Office Action in counterpart Chinese Application No. 201410395821.X, dated Nov. 28, 2016.
Written Opinion of the International Searching Authority for PCT Application No. PCT/CN2015/072040, dated May 13, 2015.
Notification of Reasons for Refusal in counterpart Korean Application No. 10-2015-7011997, dated May 2, 2016.
Notification of Reasons for Refusal in counterpart Japanese Application No. 2016-541809, dated Sep. 7, 2016.
Notice of Final Rejection in counterpart Korean Application No. 10-2015-7011997, dated Nov. 29, 2016.

\* cited by examiner

METHOD AND DEVICE FOR GRAYSCALE-UPGRADING

CROSS-REFERENCE TO RELATED APPLICATIONS

The present application is a continuation application of International Application No. PCT/CN2015/072040, filed on Jan. 30, 2015, which is based upon and claims priority to Chinese Patent Application No. 201410395821.X, filed on Aug. 12, 2014, the entire contents of both of which are incorporated herein by reference.

TECHNICAL FIELD

The present disclosure relates to the computer field and, more particularly, to a method and device for grayscale-upgrading.

BACKGROUND

Operating systems and applications often need to be upgraded. In order to ensure that all users can use an updated application or an updated operating system normally after an upgrade, a grayscale-upgrade can be performed to a few users before all users are upgraded. Grayscale-upgrade is a smooth switching during an upgrade.

According to related art, if an operating system or an application needs to be upgraded, a grayscale-upgrade is first performed to several terminal devices as a test. Then, according to results of the grayscale-upgrade, other devices are upgraded, to ensure that there is no problem in the upgrade. That is, instead of upgrading all the terminal devices at the same time, several terminal devices are upgraded first, and then other terminal devices are upgraded. During a grayscale-upgrade, a server needs to obtain an identification of each terminal device participating in the grayscale-upgrade and to send a grayscale-upgrade notification to each terminal device participating in the grayscale-upgrade. The terminal devices participating in the grayscale-upgrade are then upgraded according to the notifications. However, some devices are not suitable for grayscale-upgrade, such that an intended result cannot be achieved.

SUMMARY

In accordance with the present disclosure, there is provided a method for grayscale-upgrading. The method includes determining a target social group to be grayscale-upgraded, determining a target user account to be grayscale-upgraded in the target social group, and grayscale-upgrading an application or device corresponding to the target user account.

Also in accordance with the present disclosure, there is provided a device for grayscale-upgrading. The device includes a processor and a non-transitory computer-readable storage medium storing instructions. The instructions, when executed by the processor, cause the processor to determine a target social group to be grayscale-upgraded, determine a target user account to be grayscale-upgraded in the target social group, and grayscale-upgrade an application or device corresponding to the target user account.

Also in accordance with the present disclosure, there is provided a non-transitory computer-readable storage medium having stored therein instructions. The instructions, when executed by a processor of a mobile terminal, cause the mobile terminal to determine a target social group to be grayscale-upgraded, determine a target user account to be grayscale-upgraded in the target social group, and grayscale-upgrade an application or device corresponding to the target user account.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims. Methods consistent with embodiments of the present disclosure can be implemented in a mobile terminal, a router, or a server.

In the related art, operating systems and applications in terminal devices often need to be upgraded to newer versions. Usually, version upgrade packages are produced and tested by skilled technicians, and can be sent to users for performing the upgrade. However, due to limitations in the test on the version upgrade packages, it is unable to ensure that all users can use the operating system and applications normally after the upgrade. Therefore, some users are grayscale-upgraded before all the users are upgraded. The grayscale-upgrade is a smooth switching during an upgrade. If the operating system and the applications need to be upgraded, a grayscale-upgrade is performed on some terminal devices first as a test, and then other devices are upgraded according to a result of this test. That is, instead of upgrading all the terminal devices at the same time, some terminal devices are upgraded first, and then other terminal devices are upgraded. In the related art, when performing the grayscale-upgrade, a server sends the version upgrade packages to some devices required to participate in the grayscale-upgrade. However, these devices may not have many transactions, and thus an intended effect of the grayscale-upgrade cannot be achieved.

In order to solve this problem, the present disclosure provides a method for grayscale-upgrading, in which social groups and users with a higher level of activity (also referred to as an "activity level") are selected. Such users may spend a relatively long time on the network, and may make more transactions on the network, and thus are more suitable for the grayscale-upgrade. As a result, a better testing effect can be achieved.

Figure 1:
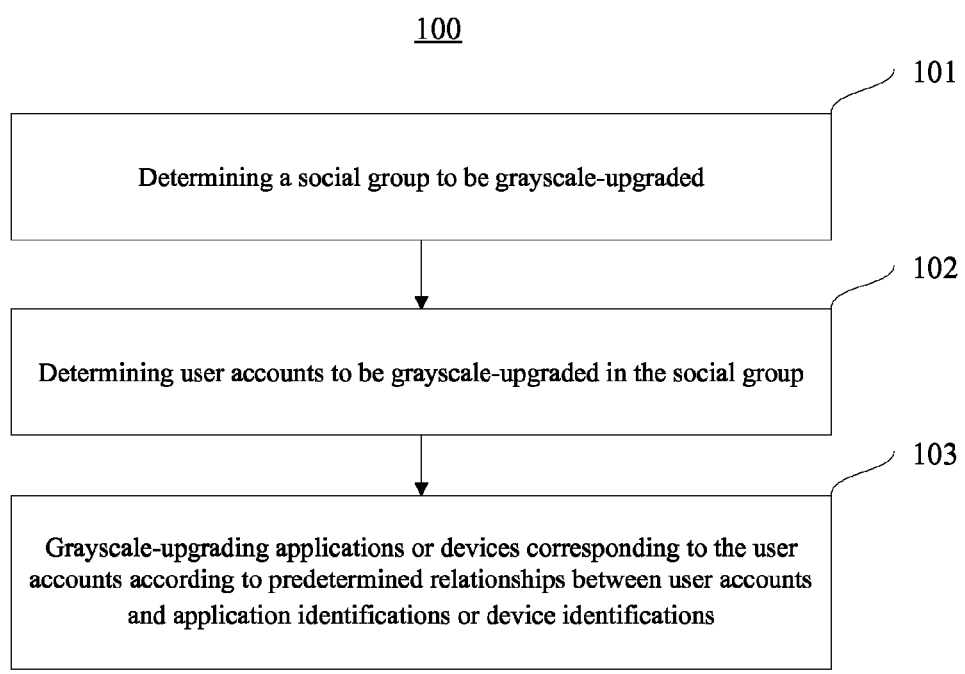
FIG. 1 is a flow chart illustrating a method for grayscale-upgrading according to an exemplary embodiment of the present disclosure.

FIG. 1 is a flow chart illustrating a method 100 for grayscale-upgrading according to an exemplary embodiment of the present disclosure. As shown in FIG. 1, at 101, a social group to be grayscale-upgraded is determined. At 102, user accounts to be grayscale-upgraded in the social group are determined. At 103, applications or devices corresponding to the user accounts are grayscale-upgraded according to predetermined relationships between user accounts and application identifications or device identifications.

According to the present disclosure, the above determination of the social group to be grayscale-upgraded, i.e., 101 of the method 100, can be accomplished by various approaches, such as Approach I-1-Approach I-3 described below.

Approach I-1: A social group with a second activity level higher than a predetermined second threshold is determined as the social group to be grayscale-upgraded. The second activity level of the social group is determined according to first activity levels corresponding to user accounts in the social group. An activity level of a user account refers to a frequency of logging into the social group by the user account or a frequency of chatting in the social group to communicate with other users in the social group. If a user account logs into a social group frequently or communicates with other users in the social group frequently, the user account is considered to be an active user account.

In some embodiments, Approach I-1 may include: II-1, determining the first activity levels of all the user accounts in the social group; II-2, determining the number of user accounts with the first activity levels meeting a predetermined first threshold; II-3, judging whether the number of user accounts with the first activity levels meeting the predetermined first threshold is greater than a predetermined fifth threshold; and II-4, determining that the second activity level of the social group is higher than the predetermined second threshold if the number of user accounts with the first activities meeting the predetermined first threshold is greater than the predetermined fifth threshold.

According to Approach I-1, activity levels of social groups are respectively analyzed to determine one or more relatively active social groups. Users in these one or more social groups are more suitable for the grayscale-upgrade.

Approach I-2: A plurality of user accounts with third activity levels higher than a predetermined third threshold are determined and one or more common social groups including the plurality of user accounts are determined as the social groups to be grayscale-upgraded. A grayscale-upgrade needs identifications of multiple terminal devices, and user accounts bound to the multiple terminal devices may join multiple social groups. Thus, by determining the common social groups including the multiple user accounts, on the one hand, the number of social groups to which a grayscale-upgrade notification needs to be sent can be reduced. On the other hand, a determined social group may include more identifications of terminal devices that need to be grayscale-upgraded. The manner for determining the third activity level of a user account is the same as that for determining the first activity level of the user account, which is described below.

According to Approach I-2, users with relatively high activity levels are determined first, and then one or more common social groups including the active users are determined. Users in such a social group are relatively more active and more suitable for the grayscale-upgrade. Further, the upgrade notification can be sent to the social group rather than to the active users individually, such that fewer notifications need to be sent. This approach improves a notification efficiency, and thus improves the efficiency of the grayscale-upgrade.

Approach I-3: A social group with a fourth activity level regarding a predetermined keyword higher than a predetermined fourth threshold is determined as the social group to be grayscale-upgraded. The keyword may be a keyword related to the grayscale-upgrade. For example, if a router is required to be grayscale-upgraded, the keyword may include a router, a network, and IP, etc. The fourth activity level may be a ratio of a number of activities including the predetermined keyword in a predetermined time period (such as a number of chatting records including the predetermined keyword) to activities of all user accounts in the predetermined time period.

According to the present disclosure, the above determination of the user accounts in the social group that are to be grayscale-upgraded, i.e., 102 of the method 100, can be accomplished by various approaches, such as Approach III-1 and Approach III-2 described below.

Approach III-1: All user accounts in the social group are determined as the user accounts to be grayscale-upgraded. Since the social group with a higher activity level has been determined at 101 of the method 100, compared to the related art, all users in such social group are more suitable for being grayscale-upgraded.

Approach III-2: User accounts with the first activity levels higher than the predetermined first threshold in the social group are determined. The first activity level of a user account may be obtained as in III-21 and III-22 described below. At III-21, a latest record of an activity level of the user account is obtained. The record includes the number of activities of the user account in a predetermined time period, and the number of activities of all the user accounts in a same social group as the user account. At III-22, the first activity level of the user account is determined according to the number of activities of the user account and the number of activities of all the user accounts in the same social group as the user account.

According to Approach III-2, users which are more active are further selected from the more active social group, such that a scope of the grayscale-upgrade is reduced because the selected users are more suitable for being grayscale-upgraded. As a result, the testing effect is further improved.

According to the present disclosure, the above grayscale-upgrading of the applications or devices corresponding to the user accounts according to the predetermined relationships between user accounts and application identifications or device identifications, i.e., 103 of the method 100, can be accomplished by various approaches, such as Approaches IV-1-IV-3 described below.

Approach IV-1 includes IV-11-V-13. At IV-11, the determined user accounts are notified of the grayscale-upgrade. Grayscale-upgrade notifications may be sent by a server. The determined user accounts may be notified one by one. Alternatively, a grayscale-upgrade notification may be broadcasted in a social group if all the users in the social group can be grayscale-upgraded. If some of the users in the social group can be grayscale-upgraded, the notification contains the determined user accounts. A terminal supporting a determined user account receives the notification. When the terminal determines that the notification contains a local user account, the terminal outputs the notification to the user and asks the user whether to perform the grayscale-upgrade. The user may agree or refuse to perform the grayscale-upgrade. If the user agrees to perform the grayscale-upgrade, the terminal sends a response to the server indicating the user agrees to the grayscale-upgrade.

At IV-12, responses indicating agreeing to the grayscale-upgrade are received.

At IV-13, applications or devices corresponding to the determined user accounts are grayscale-upgraded according to the predetermined relationships between user accounts and application identifications or device identifications.

That is, according to Approach IV-1, after an active user is determined, an authorization of the active user is requested, and the grayscale-upgrade is performed after obtaining the authorization from the active user. This approach ensures security while satisfying the users' needs.

Approach IV-2 includes IV-21 and IV-22. At IV-21, application identifications or device identifications corresponding to the user accounts are determined according to the predetermined relationships between user accounts and application identifications or device identifications. At IV-22, the application identifications or device identifications are sent to an upgrading server, to instruct the upgrading server to grayscale-upgrade the applications or devices corresponding to the determined user accounts.

That is, according to Approach IV-2, the server supporting the social group is not the same as the server performing the grayscale-upgrade. The server supporting the social group sends the application identifications of the applications to be grayscale-upgraded and the device identifications of the devices to be grayscale-upgraded to the server performing the grayscale-upgrade, i.e., the upgrading server. Then, the upgrading server sends the upgrade package. This allows for distributed deployment of servers and compatibility with the server architecture.

In some embodiments, Approach IV-2 can be combined with Approach IV-1, to send grayscale-upgrade notifications to the determined users before the upgrade package is sent. The upgrade package is sent to a user after the user agrees to upgrade.

Approach IV-3 includes IV-31-IV-33. At IV-31, a grayscale-upgrade notification is sent to the determined user accounts according to the predetermined relationships between user accounts and application identifications or device identifications. The notification contains the application identifications or device identifications corresponding to the user accounts. The notification can be sent to the determined user accounts one by one, or can be broadcasted in a social group including one or more of the determined user accounts. In some embodiments, the grayscale-upgrade notification is sent using instant messages. A device supporting the applications to be grayscale-upgraded or a device to be grayscale-upgraded receives the notification, analyzes the notification actively, and sends an upgrading request if it identifies that the notification contains a local application identification or device identification.

At IV-32, upgrading requests sent by the applications or devices corresponding to the determined user accounts are received.

At IV-33, the applications or devices corresponding to the determined user accounts are grayscale-upgraded.

For example, the application to be grayscale-upgraded is an application in a terminal and a user chats in a social group using an instant message client in the terminal. The server broadcasts a grayscale-upgrade notification in the social group. The terminal receives the notification via the local instant message client and analyzes the notification. If the terminal determines that it has a user account in the notification, the terminal sends an upgrading request to the server.

For another example, the device to be grayscale-upgraded is a router, and a user connects to the Internet via the router. All messages received or sent by the user in a social group pass through the router. The server broadcasts a grayscale-upgrade notification in the social group. The router analyzes the notification actively after receiving the notification and sends an upgrading request to the server actively if the server determines that the notification contains a local user account.

According to Approach IV-3, the device receiving the notification can send the upgrading request to the server actively without the server determining the application identification of the application to be grayscale-upgraded or the device identification of the device to be grayscale-upgraded. Thus, the efficiency of grayscale-upgrade is improved.

In some embodiments, Approach IV-3 can be combined with Approach IV-2. That is, the server supporting the social group broadcasts the notification in the social group. The terminal receiving the notification sends the upgrading request to the upgrading server. And then, the upgrading server sends the upgrade package to the terminal.

Figure 2:
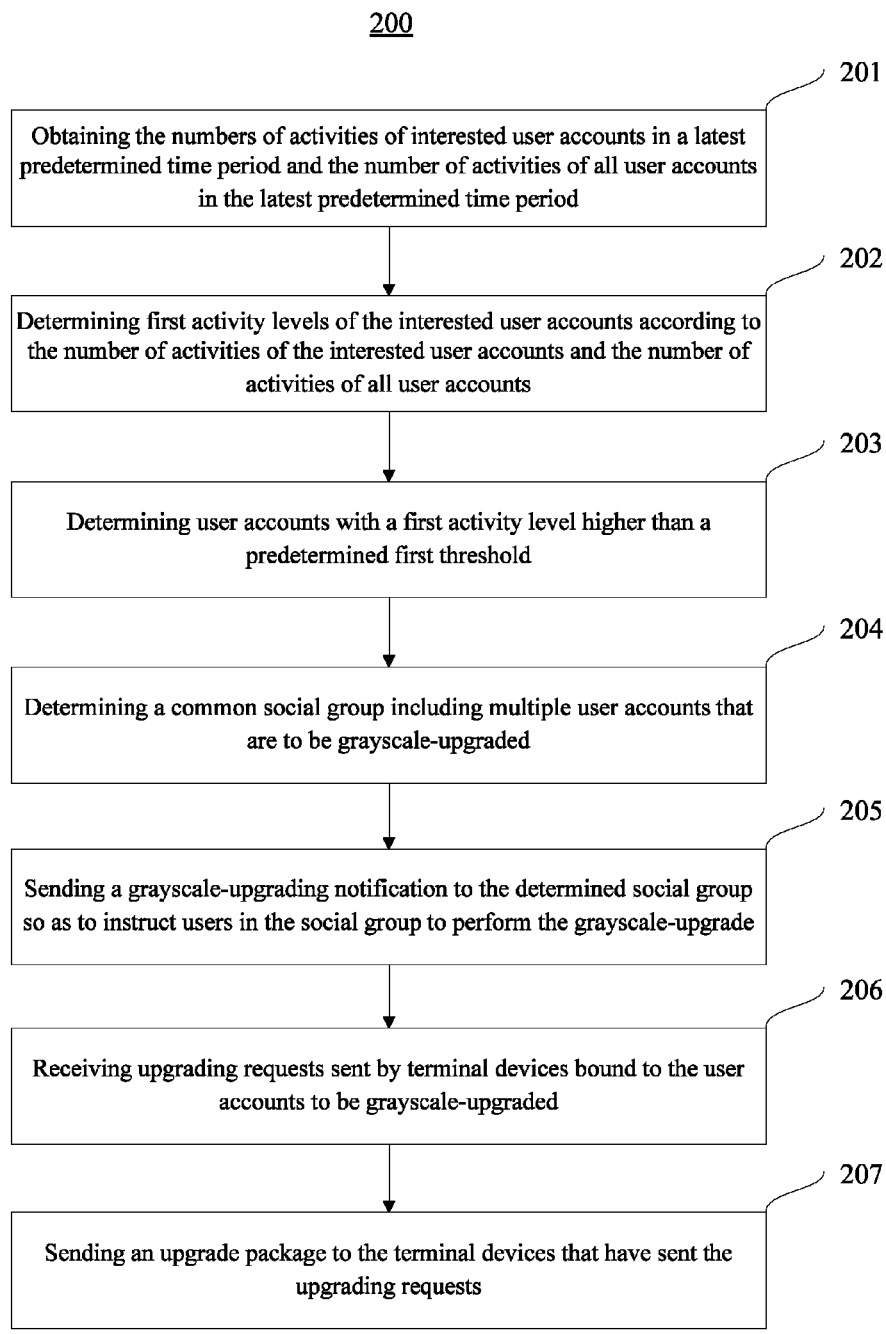
FIG. 2 is a flow chart illustrating a detailed method for grayscale-upgrading according to an exemplary embodiment of the present disclosure.

FIG. 2 shows a method 200 for grayscale-upgrading according to embodiments of the present disclosure. In the following description, terminal device identifications A, B, C, D are respectively bound to user accounts A1, B1, C1, D1. These user accounts are also referred to as interested user accounts.

As shown in FIG. 2, at 201, the numbers of activities of the interested user accounts in a latest predetermined time period (such as one month) and the number of activities of all user accounts in the latest predetermined time period (such as one month) are obtained. For example, user account A1 had 5 activities, user account B1 had 20 activities, user account C1 had 15 activities, and user account D1 had 35 activities. The number of activities of all user accounts is 100.

At 202, the first activity levels of the interested user accounts are determined according to the numbers of activities of the interested user accounts and the number of activities of all user accounts. For example, the numbers of activities of user accounts A1, B1, C1, and D1 are 5, 20, 15, and 35, respectively, and the number of activities of all user accounts is 100, thus the first activity levels of user accounts A1, B1, C1, and D1 are 5%, 20%, 15%, and 35%, respectively.

At 203, user accounts with the first activity level higher than the predetermined first threshold are determined. For example, assuming the predetermined first threshold is 18%, then the user accounts with the first activity level higher than the predetermined first threshold are user account B1 (20%) and user account D1 (35%).

If multiple user accounts are associated with devices to be grayscale-upgraded, the process continues to perform the following.

At 204, a common social group including the multiple user accounts is determined. For example, assuming user account B1 belongs to three social groups, X1, X2, and X3, and user account D1 belongs to four social groups, X2, X4, X5, and X6, then X2 is a common social group including both user account B1 and user account D1.

At 205, a grayscale-upgrade notification is sent to the determined social group so as to instruct users in the social group to perform the grayscale-upgrade. For example, the grayscale-upgrade notification is sent to social group X2 so as to instruct users in social group X2 to perform the grayscale-upgrade.

At 206, upgrading requests sent by terminal devices bound to the user accounts are received. For example, the terminal devices bound to user accounts B1 and D1 are terminal devices having terminal device identifications B and D, respectively.

At 207, an upgrade package is sent to the terminal devices that have sent the upgrading requests.

Figure 3:
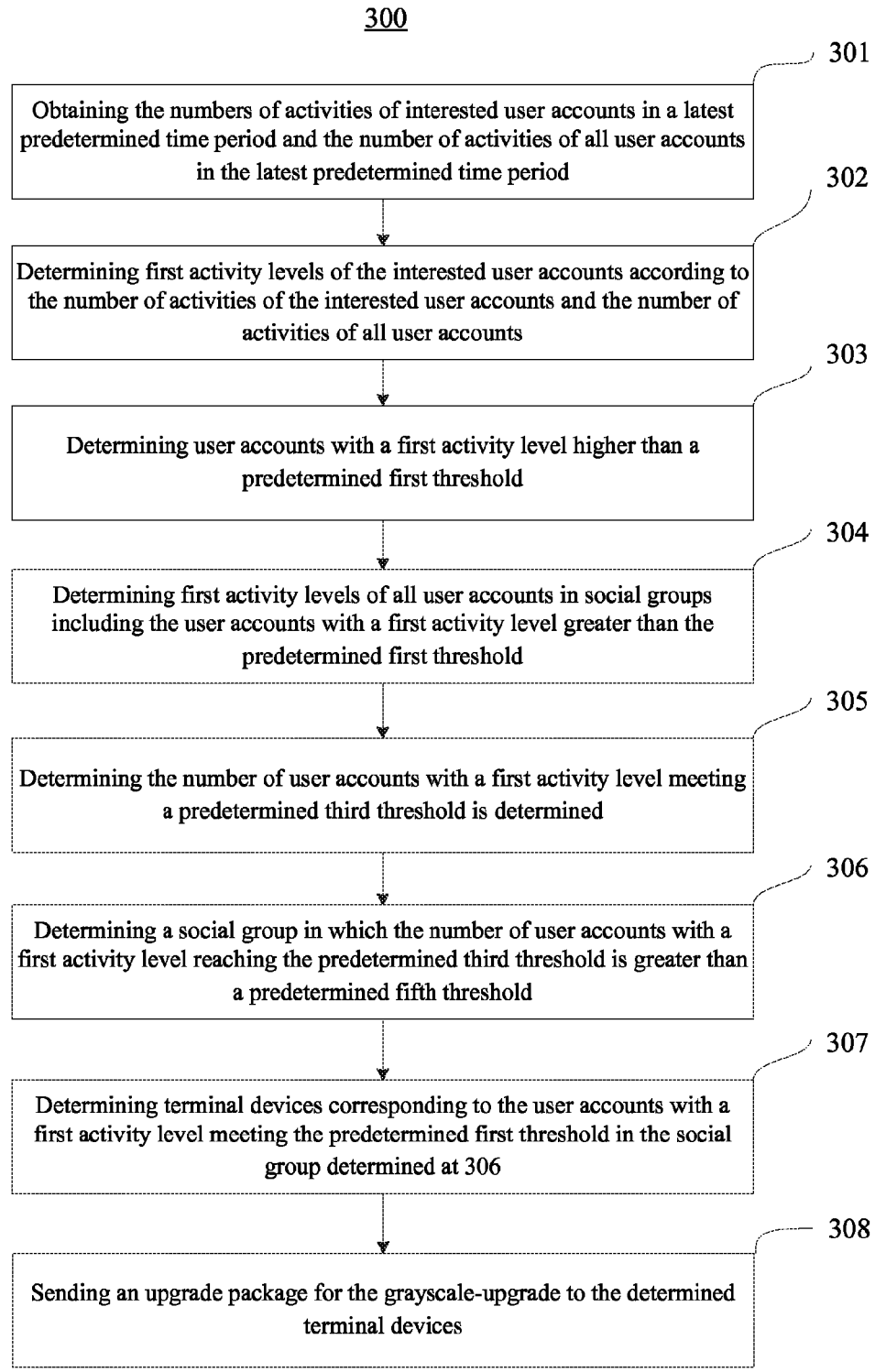
FIG. 3 is a flow chart illustrating another detailed method for grayscale-upgrading according to an exemplary embodiment of the present disclosure.

FIG. 3 shows a method 300 for grayscale-upgrading according to embodiments of the present disclosure. In the following description, terminal device identifications A, B, C, D are respectively bound to user accounts A1, B1, C1, D1. These user accounts are also referred to as interested user accounts.

As shown in FIG. 3, at 301, the numbers of activities of the interested user accounts in a latest predetermined time period (such as one month) and the number of activities of all user accounts in the latest predetermined time period (such as one month) are obtained. For example, user account A1 had 5 activities, user account B1 had 20 activities, user account C1 had 15 activities, and user account D1 had 35 activities. The number of activities of all user accounts is 100.

At 302, the first activity levels of the interested user accounts are determined according to the numbers of activities of the interested user accounts and the number of activities of all user accounts. For example, the numbers of activities of user accounts A1, B1, C1, and D1 are 5, 20, 15, and 35, respectively, and the number of activities of all user accounts is 100, thus the first activity levels of user accounts A1, B1, C1, and D1 are 5%, 20%, 15%, and 35%, respectively.

At 303, user accounts with the first activity level higher than the predetermined first threshold are determined. For example, assuming the predetermined first threshold is 18%, then the user accounts with the first activity level higher than the predetermined first threshold are user account B1 (20%) and user account D1 (35%).

At 304, the first activity levels of all user accounts in social groups including the user accounts with the first activity level higher than the predetermined first threshold are determined.

For example, user account B1 belongs to social group Y1, and there are nine other user accounts in social group Y1, which are E1, E2, E3, E4, E5, E6, E7, E8, and E9. The first activity levels of these nine user accounts are 15% for user account E1, 23% for user account E2, 22% for user account E3, 10% for user account E4, 7% for user account E5, 12% for user account E6, 20% for user account E7, 9% for user account E8, and 21% for user account E9. User account D1 belongs to two social groups Y2 and Y3. There are seven other user accounts in social group Y2, which are F1, F2, F3, F4, F5, F6, and F7. The first activity levels of these seven user accounts are 18% for user account F1, 13% for user account F2, 2% for user account F3, 10% for user account F4, 7% for user account F5, 12% for user account F6, and 26% for user account F7. There are ten other user accounts in social group Y3, which are G1, G2, G3, G4, G5, G6, G7, G8, G9, and G10. The first activity levels of these ten user accounts are 16% for user account G1, 14% for user account G2, 20% for user account G3, 20% for user account G4, 17% for user account G5, 19% for user account G6, 26% for user account G7, 30% for user account G8, 5% for user account G9, and 6% for user account G10.

At 305, the number of user accounts with the first activity level meeting the predetermined third threshold is determined. For example, assuming the predetermined third threshold is 18%, then in social group Y1, the number of user accounts with the first activity level meeting the predetermined third threshold is 5. In social group Y2, the number of user accounts with the first activity level meeting the predetermined third threshold is 2. In social group Y3, the number of user accounts with the first activity level meeting the predetermined third threshold is 6.

At 306, a social group in which the number of user accounts with the first activity level meeting the predetermined third threshold is greater than the predetermined fifth threshold is determined. For example, assuming the predetermined fifth threshold is 5, then among social groups Y1, Y2, and Y3, only social group Y3 has more than 5 user accounts with the first activity level meeting the predetermined third threshold. Thus, social group Y3 is determined as the social group to which the grayscale-upgrade notification needs to be sent.

At 307, terminal devices corresponding to the user accounts with the first activity level meeting the predetermined first threshold in social group Y3 are determined.

At 308, an upgrade package for the grayscale-upgrade is sent to the determined terminal devices.

Figure 4:
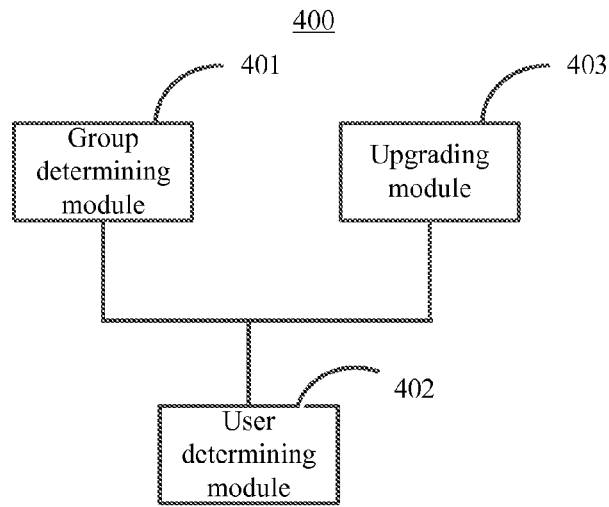
FIG. 4 is a block diagram illustrating a device for grayscale-upgrading according to an exemplary embodiment of the present disclosure.

FIG. 4 is a block diagram illustrating a device 400 for grayscale-upgrading according to an exemplary embodiment of the present disclosure. Referring to FIG. 4, the device 400 includes a group determining module 401, a user determining module 402, and an upgrading module 403. The group determining module 401 is configured to determine a social group to be grayscale-upgraded. The user determining module 402 is configured to determine user accounts to be grayscale-upgraded in the social group. The upgrading module 403 is configured to grayscale-upgrade applications or devices corresponding to the user accounts according to predetermined relationships between user accounts and application identifications or device identifications.

Figure 5A:
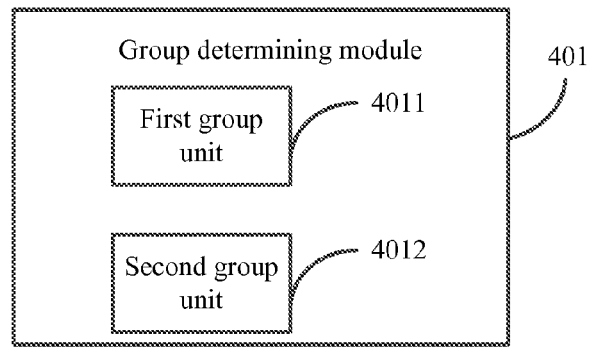
FIGS. 5A and 5B are a block diagrams illustrating a group determining module according to exemplary embodiments of the present disclosure.

In some embodiments, as shown in FIG. 5A, the group determining module 401 includes a first group unit 4011 and a second group unit 4012. The first group unit 4011 is configured to define a social group with the second activity level higher than the predetermined second threshold as the social group to be grayscale-upgraded. The second group unit 4012 is configured to determine a plurality of user accounts with the third activity level higher than the predetermined third threshold and define a common social group including the plurality of user accounts as the social group to be grayscale-upgraded.

Figure 5B:
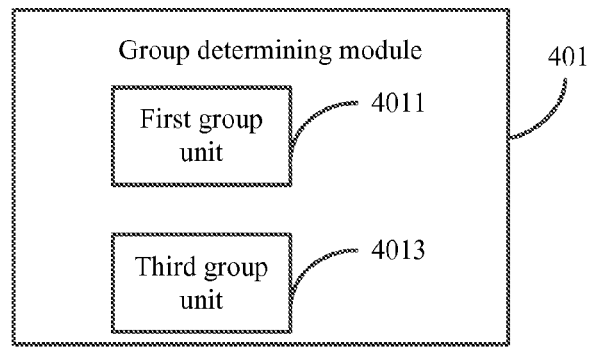

In some embodiments, as shown in FIG. 5B, the group determining module 401 includes the first group unit 4011 and a third group unit 4012. The third group unit 4013 is configured to define a social group with a fourth activity regarding a predetermined keyword greater than the predetermined fourth threshold as the social group to be grayscale-upgraded.

Figure 6:
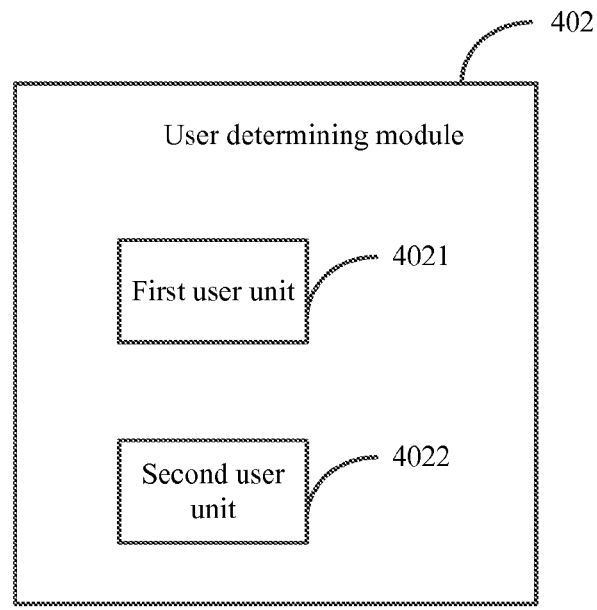
FIG. 6 is a block diagram illustrating a user determining module according to an exemplary embodiment of the present disclosure.

In some embodiments, as shown in FIG. 6, the user determining module 402 includes a first user unit 4021 and a second user unit 4022. The first user unit 4021 is configured to determine all user accounts in the social group as the user accounts to be grayscale-upgraded. The second user unit 4022 is configured to determine user accounts with the first activity level higher than the predetermined first threshold in the social group.

Figure 7:
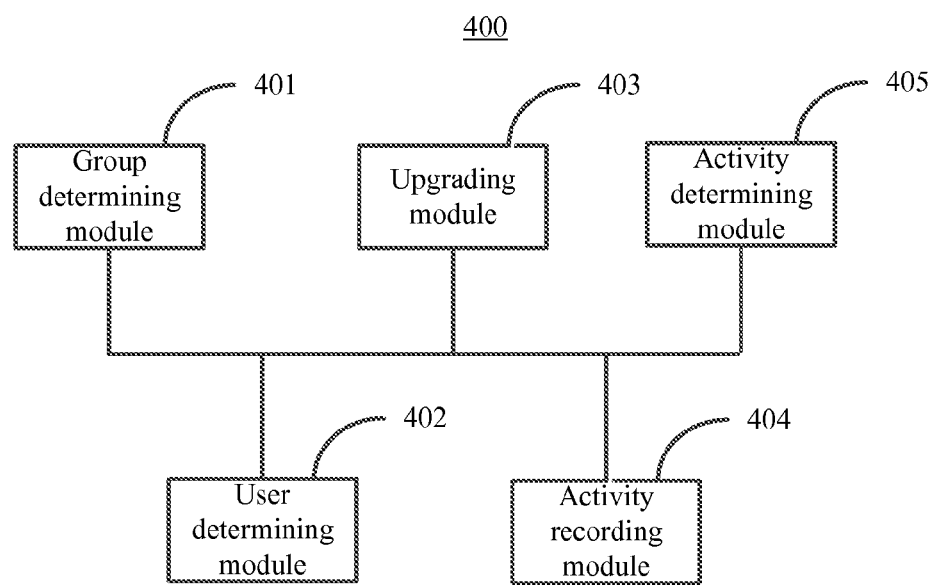
FIG. 7 is a block diagram illustrating a device for grayscale-upgrading according to an exemplary embodiment of the present disclosure.

In some embodiments, as shown in FIG. 7, the device 400 further includes an activity recording module 404 and an activity determining module 405. The activity recording module 404 is configured to obtain a latest record of activities of a user account. The record includes the number of activities of the user account in a predetermined time period, and the number of activities of all user accounts in a same social group as the user account. The activity determining module 405 is configured to determine the first activity level of the user account according to the number of activities of the user account and the number of activities of all user accounts in the same social group as the user account.

Figure 8:
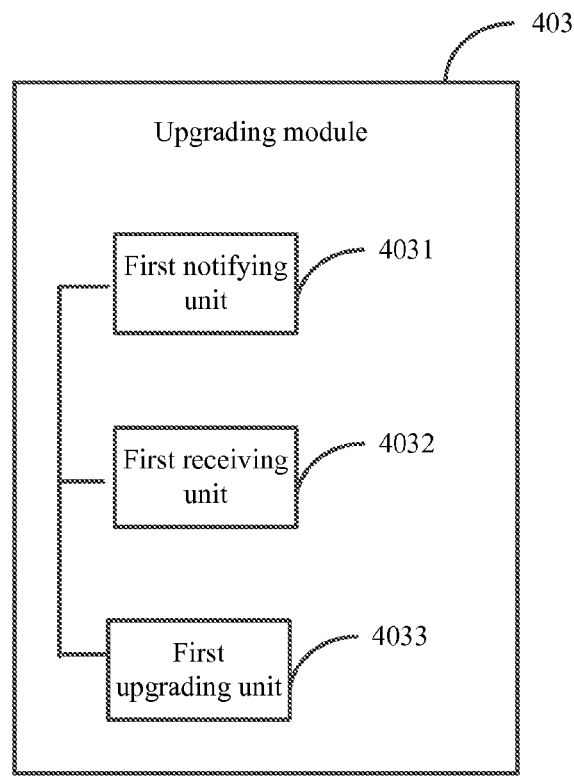
FIG. 8 is a block diagram illustrating an upgrading module according to an exemplary embodiment of the present disclosure.

In some embodiments, as shown in FIG. 8, the upgrading module 403 includes a first notifying unit 4031, a first receiving unit 4031, and a first upgrading unit 4033. The first notifying unit 4031 is configured to send a grayscale-upgrading notification to the determined user account. The first receiving unit 4032 is configured to receive a response indicating an agreement to the grayscale-upgrade. The first upgrading unit 4033 is configured to grayscale-upgrade the application or device corresponding to the determined user account according to the predetermined relationships between user accounts and device identifications.

Figure 9:
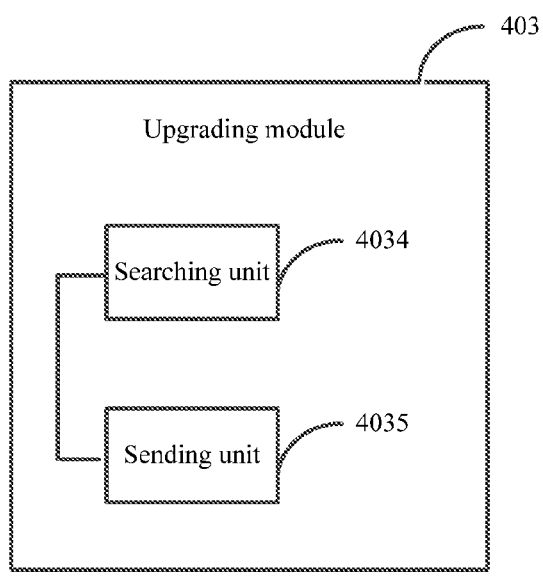
FIG. 9 is a block diagram illustrating an upgrading module according to an exemplary embodiment of the present disclosure.

In some embodiments, as shown in FIG. 9, the upgrading module 403 includes a searching unit 4034 and a sending unit 4035. The searching unit 4034 is configured to determine the application identification or device identification corresponding to the determined user account according to the predetermined relationships between user accounts and application identifications or device identifications. The sending unit 4035 is configured to send the application identification or device identification to an upgrading server to instruct the upgrading server to grayscale-upgrade the application or device corresponding to the determined user accounts.

Figure 10:
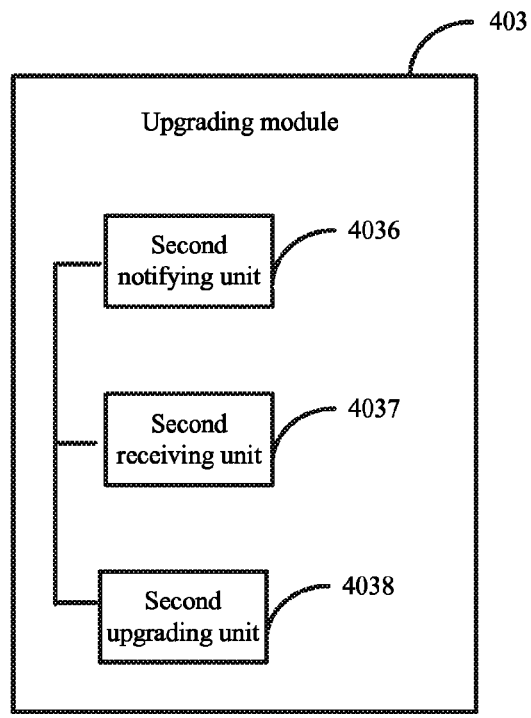
FIG. 10 is a block diagram illustrating an upgrading module according to an exemplary embodiment of the present disclosure.

In some embodiments, as shown in FIG. 10, the upgrading module 403 includes a second notifying unit 4036, a second receiving unit 4037, and a second upgrading unit 4038. The second notifying unit 4036 is configured to send the grayscale-upgrade notification to the determined user account according to the predetermined relationships between user accounts and application identifications or device identifications. The notification contains the application identification or device identification corresponding to the determined user account. The second receiving unit 4037 is configured to receive an upgrading request sent by the application or device corresponding to the determined user account. The second upgrading unit 4038 is configured to grayscale-upgrade the application or device corresponding to the determined user account.

Specific operations of devices consistent with embodiments of the present disclosure are similar to the methods described above, and are thus omitted here.

Figure 11:
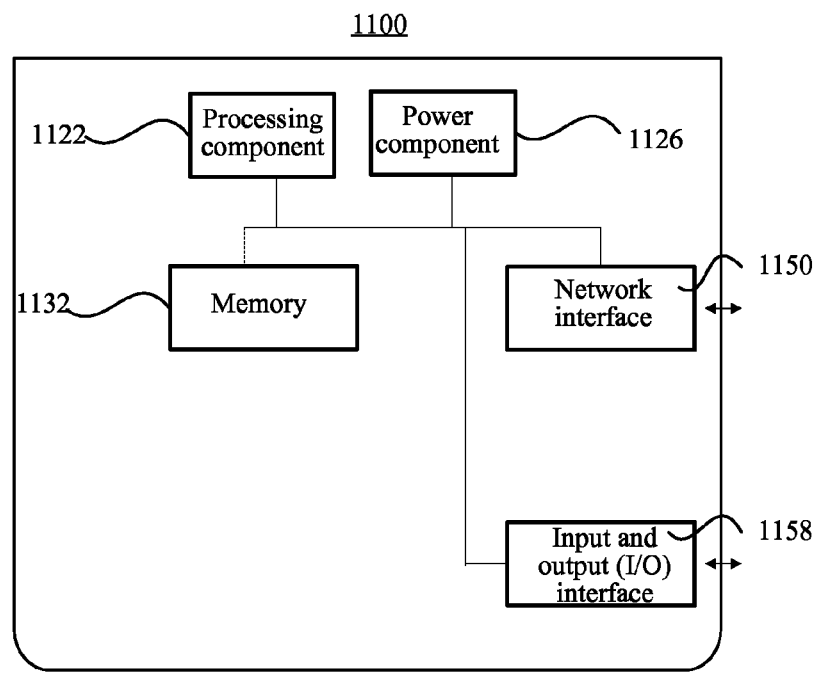
FIG. 11 is block diagram illustrating a device for grayscale-upgrading according to an exemplary embodiment of the present disclosure.

FIG. 11 is a block diagram of a device 1100 for grayscale-upgrading according to an exemplary embodiment of the present disclosure. For example, the device 1100 may be provided as a computer. Referring to FIG. 11, the device 1100 includes a processing component 1122 including one or more processors, and a memory resource represented by a memory 1132 for storing instructions (such as application programs) executable by the processing component 1122. The application programs stored in the memory 1132 may include one or more modules, and each module may correspond to a series of instructions. Furthermore, the processing component 1122 may be configured to execute the instructions so as to perform the above-described methods for grayscale-upgrading.

The device 1100 further includes a power component 1126 configured to perform a power management of the device 1100, a wired or wireless network interface 1150 configured to connect the device 1100 to the Internet, and an input and output (I/O) interface 1158. The device 1100 may operate an operating system stored in the memory 1132, such as Windows Server™, Mac OS X™, Unix™, Linux™, FreeBSD™ and so on.

According to the present disclosure, there is provided a device for grayscale-upgrading including a processor and a non-transitory computer-readable storage medium storing instructions that, when executed by the processor, cause the processor to perform a method for grayscale-upgrading consistent with embodiments of the present disclosure.

According to the present disclosure, there is also provided a non-transitory computer-readable storage medium having stored therein instructions that, when executed by a processor of a mobile terminal, cause the mobile terminal to perform a method for grayscale-upgrading consistent with embodiments of the present disclosure.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for test-upgrading, comprising:
    determining a target social group to be test-upgraded according to user activity levels of user accounts in the target social group;
    determining a target user account to be test-upgraded in the target social group, wherein determining the target user account includes determining a user account with a user activity level higher than a predetermined user activity threshold in the target social group as the target user account; and test-upgrading an application or device corresponding to the target user account by sending an upgrade package to a terminal containing the application or to the device.

2. The method according to claim 1, wherein determining the target user account includes determining all user accounts in the target social group as target user accounts to be test-upgraded.

3. The method according to claim 1, further comprising:
obtaining a record of activities of the user account, the record including an individual number of activities of the user account in a predetermined time period and a total number of activities of all user accounts in the target social group; and
determining the user activity level of the user account according to the individual number and the total number.

4. The method according to claim 1, wherein determining the target social group includes determining a social group with a group activity level higher than a predetermined group activity threshold as the target social group.

5. The method according to claim 1, wherein determining the target social group includes:
determining a plurality of user accounts each of which having a user activity level higher than a predetermined user activity threshold; and
determining a common social group including the plurality of user accounts as the target social group.

6. The method according to claim 1, wherein determining the target social group includes determining a social group with a group-keyword activity level regarding a predetermined keyword higher than a predetermined group-keyword activity threshold as the target social group.

7. The method according to claim 1, wherein test-upgrading the application or device includes:
sending a test-upgrade notification to the target user account;
receiving a response from the target user account indicating an agreement to be test-upgraded; and
test-upgrading the application or device after receiving the response.

8. The method according to claim 1, wherein test-upgrading the application or device includes:
determining an application identification or device identification corresponding to the target user account; and
sending the application identification or device identification to an upgrading server to instruct the upgrading server to test-upgrade the application or device.

9. The method according to claim 1, wherein test-upgrading the application or device includes:
sending a test-upgrading notification to the target user account, the notification containing the application identification or device identification corresponding to the target user account;
receiving an upgrading request sent by the application or device corresponding to the target user account; and
test-upgrading the application or device corresponding to the target user account in response to the request.

10. A device for test-upgrading, comprising:
a processor; and
a non-transitory computer-readable storage medium storing instructions that, when executed by the processor, cause the processor to:

determine a target social group to be test-upgraded according to user activity levels of user accounts in the target social group;
determine a target user account to be test-upgraded in the target social group, wherein determining the target user account includes determining a user account with a user activity level higher than a predetermined user activity threshold in the target social group as the target user account; and
test-upgrade an application or device corresponding to the target user account by sending an upgrade package to a terminal containing the application or to the device.

11. The device according to claim 10, wherein the instructions further cause the processor to:
determine all user accounts in the target social group as target user accounts to be test-upgraded.

12. The device according to claim 10, wherein the instructions further cause the processor to:
obtain a record of activities of the user account, the record including an individual number of activities of the user account in a predetermined time period and a total number of activities of all user accounts in the target social group; and
determine the user activity level of the user account according to the individual number and the total number.

13. The device according to claim 10, wherein the instructions further cause the processor to:
determine a social group with a group activity level higher than a predetermined group activity threshold as the target social group; or
determine a plurality of user accounts each of which having a user activity level higher than a predetermined user activity threshold, and determine a common social group including the plurality of user accounts as the target social group; or
determine a social group with a group-keyword activity level regarding a predetermined keyword higher than a predetermined group-keyword activity threshold as the target social group.

14. The device according to claim 10, wherein the instructions further cause the processor to:
send a test-upgrade notification to the target user account;
receive a response from the target user account indicating an agreement to be test-upgraded; and
test-upgrade the application or device after receiving the response.

15. The device according to claim 10, wherein the instructions further cause the processor to:
determine an application identification or device identification corresponding to the target user account; and
send the application identification or device identification to an upgrading server to instruct the upgrading server to test-upgrade the application or device.

16. The device according to claim 10, wherein the instructions further cause the processor to:
send a test-upgrading notification to the target user account, the notification containing the application identification or device identification corresponding to the target user account;
receive an upgrading request sent by the application or device corresponding to the target user account; and
test-upgrade the application or device corresponding to the target user account in response to the request.

17. A non-transitory computer-readable storage medium having stored therein instructions that, when executed by a processor of a mobile terminal, cause the mobile terminal to:
    determine a target social group to be test-upgraded according to user activity levels of user accounts in the target social group;
    determine a target user account to be test-upgraded in the target social group, wherein determining the target user account includes determining a user account with a user activity level higher than a predetermined user activity threshold in the target social group as the target user account; and
    test-upgrade an application or device corresponding to the target user account by sending an upgrade package to a terminal containing the application or to the device.

\* \* \* \* \*